Patented Oct. 28, 1952

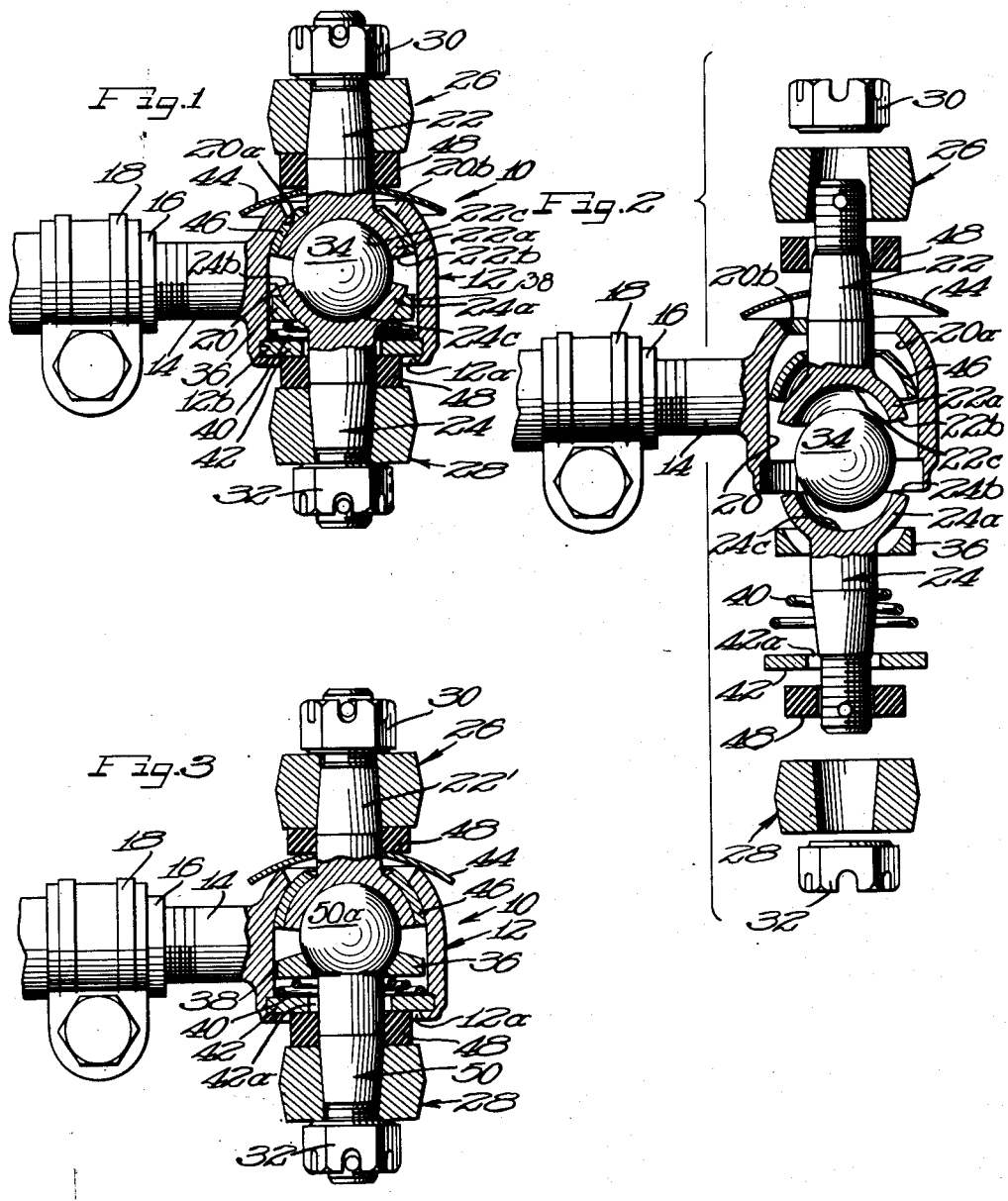

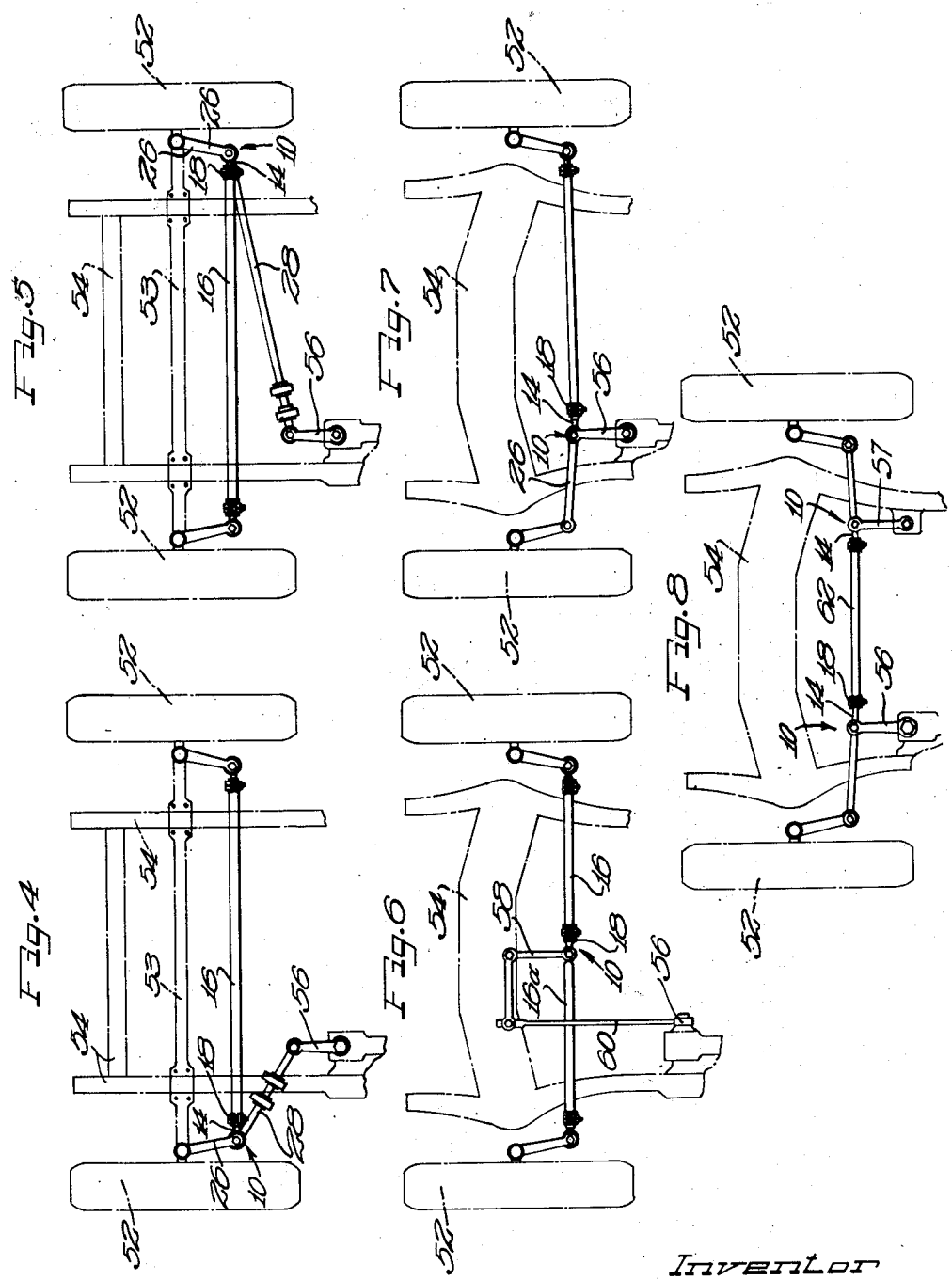

2,615,737

UNITED STATES PATENT OFFICE 2,615,737

JOINT CONSTRUCTION

Marshall H. Alldredge, Detroit, and Matthew P. Graham, Grosse Pointe, Mich., assignors to Thompson Products, Inc., Cleveland, Ohio, a corporation of Ohio Application July 20, 1949, Serial No. 105,836

14 Claims. (Cl. 287—90)

This invention relates to a joint construction accommodating relative rotation and relative tilting movement of the parts, and relates particularly to a tie rod joint construction adapted for automotive vehicle steering unit installations.

Specifically this invention relates to a simple joint construction adapted to connect the tie rod or other linkage arm of a steering unit with two other linkages of the steering unit. Heretofore, steering units for automotive vehicles have generally utilized at least three stud joints. The construction here provided replaces two of these heretofore used stud joints.

The tie rod joint of this invention comprises a socket or housing having a stud element extending from each end thereof. A wide latitude of rotary and angular movement is permitted by the joint of this invention, and the joint is self-adjusting to compensate for bearing wear.

Other multi-stud joint constructions have been developed and utilized with varying success. With an understanding of the teachings of the present invention a multi-stud joint construction can be economically obtained by using identical stud elements which are easily assembled about a centrally disposed ball within the socket or housing. A spring-urged freely disposed washer or collar member urges one of the stud elements toward the oppositely disposed stud element so as to maintain the elements in assembled relation with the oppositely disposed stud element seated in bearing relation with the housing. In one form, a ball is interposed between the stud elements and in a modification of the present invention the ball is integral with one stud element.

It is, therefore, an object of this invention to provide an improved tie rod joint having oppositely disposed stud elements extending therefrom.

Another object of this invention is to provide a tie rod joint adapted to connect the tie rod or other linkage member with two separate linkage members of a steering control unit.

Another object of this invention is to provide a freely lubricated tie rod joint for automotive vehicles which is simply and economically designed and assembled and which automatically adjusts to compensate for bearing wear.

Another object of this invention is to provide a compound tie rod joint having a pair of studs freely rotatable and tiltable about a common center.

Other and further objects of this invention will be apparent to those skilled in the art from the following detailed description of the accompanying sheets of drawings illustrating preferred embodiments of this invention.

On the drawings:

Figure 1 is a fragmentary cross-sectional view, with parts in elevation, of a joint construction according to this invention and showing the manner in which the joint connects three linkage members of a steering control unit for automotive vehicles;

Figure 2 is a view similar to Figure 1, but showing the parts in exploded, or partially assembled position;

Figure 3 is a view similar to Figure 1 of a joint construction in accordance with this invention, but illustrates a modification of the invention in that a ball-ended stud element is substituted for the ball and lower stud element of Figure 1;

Figure 4 is a diagrammatic showing of a steering linkage unit for a solid axle wheel suspension wherein the joint construction of this invention connects the tie rod to the steering arm of the left front wheel of a vehicle and to a drag link on the pitman arm;

Figure 5 is a diagrammatic view similar to Figure 4 wherein the joint of this invention connects the tie rod to the right steering arm and to the drag link on the pitman arm;

Figure 6 is a diagrammatic view of a "center point" steering linkage unit for an individual wheel suspension wherein the joint connects the pitman idler to two tie rods connecting the right and left steering arms;

Figure 7 is another steering linkage for an individual wheel suspension wherein the joint of this invention connects the pitman arm to linkages on each of the steering arms; and Figure 8 is a similar view wherein two joints incorporating the features of this invention are used, one connecting the pitman as in Figure 7, and the other similarly connecting an additional idler arm to the tie rod and front left steering arm.

As shown on the drawings:

In Figure 1 and the other figures the reference numeral 10 indicates generally a tie rod joint constructed in accordance with this invention. The joint is encased within a housing or socket member 12 having an integrally formed stem or shank 14 which is adjustably threaded into the split end of a tie rod 16 or other linkage member of the steering control unit. The end of the tie rod 16 is longitudinally slotted or split to permit a clamp 18 to tighten the rod around the shank 14 of the housing. The housing 12 is hollow and open-ended with a substantially cylindrical chamber 20 therein and with a segmental spherical end portion 20a converging to a restricted opening 20b. The other end of the chamber extends to a counterbore 12b in the housing.

The tie rod joint 10 has a pair of oppositely disposed studs 22 and 24 with heads in the chamber 20 and shanks projecting freely from the opposite ends of the housing through the opening 20b and counterbore 12b respectively. The studs 22 and 24 are adapted to receive the linkage members 26 and 28 respectively, which members will be more particularly described later with reference to Figures 4 to 8, inclusive, illustrating the various installations of the joints in automotive vehicle steering units. The linkages 26 and 28 are held on the shanks of the identical stud elements 22 and 24 by nuts 30 and 32 respectively which are threaded on the ends of the shanks.

The stud 22 has formed thereon a segmental ball end 22a having a tapered bottom portion 22b with a spherically-formed countersunk or well portion 22c in the center thereof for receiving a portion of a centering ball 34.

The stud 24 is identical with the stud 22 and thus is provided with a segmental ball end 24a having a tapered bottom 24b with a spherically countersunk portion or well 24c in the center thereof receiving a portion of the ball 34 diametrically opposite that portion received by the stud 22.

The segmental ball portion 24a of the stud 24 is embraced by a washer or collar member 36 which is disposed within the housing 12 and is of lesser diameter than the chamber 20 to provide a lubrication clearance 38 between its outer periphery and the housing 12. The washer 36 has a segmental ball contour around its inner periphery to seat on the stud segmental ball portion 24a. The washer 36 and the stud 24 are urged toward the centering ball 34 and the stud 22 by a tapered coil spring 40 which is disposed between the washer 36 and a closure washer 42 which is secured in the counterbore 12b in the housing 12. The washer 42 has a central aperture 42a for loosely embracing the shank of the stud 24 and is secured in the counterbore 12b by a spur or peened-over lip or flange 12a.

A spherically-contoured washer member 44 embraces the shank of stud 22 adjacent the housing 12 and provides a dust cover for a bearing element 46 which is disposed about the segmental ball portion 22a of the stud 22 between that member and the converging spherical portion 20a of the housing 12. The bearing member 46 receives the bearing pressure of the joint from both the studs 22 and 24 because the tapered coil spring 40 urges the stud 24 and ball 34 against the ball portion 22a of stud 22. It will be noted that the stud element 24 does not bear against the socket or housing 12, being urged as previously mentioned by the spring-biased washer 42 toward the stud 22. This urging compensates for wear on the elements by continually maintaining bearing contact between the bearing member 46 and the ball portion 22a.

Each of the studs is embraced by a rubber-like washer or gasket member 48, the upper gasket as shown in Figures 1 and 2 being disposed between the linkage 26 and the dust cover 44 and the lower gasket member 48 being disposed between the seating element 42 and the linkage 28.

Figure 2 clearly illustrates the assembly of the various elements making up the tie rod joint.

The assembled joint 10 receives the tilting and rotating movements of the stud elements 22 and 24 at the center of the ball 34. The forces causing such movements are brought to bear ultimately on the bearing element 46.

Figure 3 illustrates one particular modification of the invention wherein a ball-ended stud 50 replaces the ball 34 and stud 24 of the joint illustrated in Figures 1 and 2. The upper stud 22' is identical to the aforedescribed studs 22 and 24. The ball end portion 50a of stud 50 is embraced by a modified washer element 36' which allows the same lubrication clearance 38 as aforedescribed.

The joint of Figure 3 may be more simply assembled, but requires two different stud elements for each assembly. Since both studs, in either of the embodiments aforedescribed, rotate about the same center, the forces applied to the joint from any one of the attaching linkages do not bring about any component forces tending to rotate or bend any of the linkages. Further, each stud rotates independently of the other stud. The cup-shaped bearing member 46 may be dispensed with, but it is generally desirable to incorporate such a bearing member which may be conventionally manufactured in order to dispense with excess bearing wear on the housing 12.

It is obvious that a force transmitted to the joint by any one of the linkages 26, 28 or the tie rod or other linkage 16 results in the transmittal of the force and resultant components to one or both of the remaining aforementioned linkages. Thus, it is seen that the joint may be advantageously installed in any one of a number of positions in steering control units of automotive vehicles. For instance, in Figure 4 there is illustrated in broken outline a pair of steerable front wheels 52, an axle 53, and frame members 54 of such a vehicle wherein either of the aforedescribed embodiments of the joint 10 is located near the left wheel of the figure. In this installation the joint housing shank 14 is clamped by the clamp 18 to the tie rod 16. The linkage 26 (illustrated in Figures 1, 2 and 3) in this installation is the steering arm of the left front wheel, and the linkage 28 is a drag link which attaches the pitman arm 56 of the steering mechanism to the joint 10. Thus, joint 10 connects the pitman arm to the left steering arm and tie rod.

This particular steering linkage design provides an economical linkage for steering control. It would, of course, be possible to locate the housing shank in any one of the three connecting linkages as, for instance, the left steering arm, in which case the drag link and tie rod would then connect to the stud elements mounted in the housing.

In Figure 5 there is illustrated an installation wherein the joint housing shank 14 is clamped by the clamp 18 to the tie rod 16 and the linkage 26 is the steering arm to the right front wheel while the linkage 28 is the drag link connecting the steering gear pitman arm 56 to the joint 10. Here, again, installation of the double stud joint dispenses with an extra joint.

Each of the aforementioned installations has advantages in that the socket and joint could be fitted well within the rim of a front wheel so as to clear the various parts of the wheel. Here, again, it would be possible to incorporate the housing in any one of the three connecting linkages.

In Figure 6 there is illustrated a "center point steering" unit commonly used on automotive vehicles, wherein a crank arm 58 is pivoted to the frame 54 of the vehicle close to the center point of the frame and has one arm portion connected to a drag link 60 which drag link in turn is connected to a steering gear pitman arm 56 for transmitting steering movement from the arm 56 to the idler arm 58. In this installation, after the arm portion of the crank 58 is attached to one of the studs of the joint mechanism, the other stud element is connected to one of the tie rods 16a while the joint housing shank or stem 14 is clamped, as by the clamp 18, to the other tie rod 16 which tie rods connect the steering arms for the front wheels 52. Utilization of the joint 10 enhances the center point steering since the point of oscillation of both tie rods has been reduced to a single center. The steering is thus equally forcible in both directions, eliminating compromises which have been necessary in designs heretofore utilized. It is, of course, possible to interchange the linkage connections to the joint 10 without departing from the efficient operation of the steering joints.

In Figure 7 there is illustrated a pitman arm 56 attached to the steering gear at its one end and attached at its other end to one of the studs of the joint 10. The linkage 26 of this installation attaches to the left front wheel steering arm. The shank 14 of the housing is clamped to the linkage to the right wheel steering arm. Incorporation of the joint of this invention eliminates one socket entirely. Obviously, the linkage connections to the joints could be interchanged.

In Figure 8 there is illustrated a steering linkage unit wherein two ball joints 10 are installed. One joint 10 is connected by a stud to the pitman arm 56 which is connected at its other end to the steering gear, and the other joint 10 is connected by a stud to an idler arm 57 pivoted to the frame 54 of the vehicle. In such an installation, the upper studs of the joints are attached to the pitman arm and the idler arm, and the lower studs are attached to linkages to the steering arms of the front wheels 52. The joint housing shanks 14 are clamped by the clamps 18 to an intermediate link 62 connecting the two joints 10. By the incorporation of the joints 10, the steering control design is simplified in that it requires a lesser number of parts and is, of course, a more economical installation.

In the aforedescribed steering linkage unit, the incorporation of the multi-stud joints eliminates steering movement caused by flexing of the front springs of the vehicle. This undesirable steering movement caused by the flexing is brought about through flexing the linkages to a series of conventional joints. Here two joints are eliminated by joints which have elements tiltable and rotatable about a single center, thereby minimizing the flexing of linkages.

It will be understood that modifications and variations may be effected without departing from the scope of the novel concepts of the present invention.

We claim as our invention:

1. A tie rod joint comprising an open-ended housing, a first stud member having a head in said housing and a shank extending therefrom through an open end of the housing, a seat loosely disposed within said housing and embracing said stud head, a closure washer around said shank of said stud member and secured in said open end of the housing, a coil spring acting between said closure washer and said seat, a second stud member having a head in said housing and a shank through the opposite end of said housing, a bearing element on said second stud head, seating means associated with the stud heads, whereby said stud members move about a common center, and means on said housing for connection to a linkage member, whereby forces applied to said linkage member will cause relative movement of linkages connected to said stud members.

2. A tie rod joint comprising an open-ended housing, an inturned flange on the bottom of said housing defining an aperture, a stud member extending through said aperture, a hollowed segmental ball portion on the end of said stud member within said housing, a washer member loosely disposed within said housing and having a segmental spherical bearing surface cooperating with said ball portion, a retaining member secured by said flange, a coil spring acting between said retaining member and said washer member, a second stud member identical to said first stud member and extending through the opposite end of said housing, a bearing element disposed between the ball end of said second stud member and said housing, a ball disposed between the hollow segmental ball portions of the stud members, and means on said housing for connection to a linkage member of a vehicle steering control unit whereby forces applied to said linkage member will cause relative movement of linkages connected to said stud members.

3. A tie rod joint comprising an open-ended housing, an inturned flange on the bottom of said housing defining an aperture, a stud member extending through said aperture, a ball portion on the end of said stud member within said housing, a washer member loosely disposed within said housing and having a segmental spherical bearing surface cooperating with said ball portion, a retaining member secured by said flange, a coil spring acting between said retaining member and said washer member, a second stud member extending through the opposite end of said housing, a hollowed segmental ball portion on the end of said second stud member within said housing, a bearing element between the ball end of said second stud member and said housing, and means on said housing for connection to a linkage member of a vehicle steering control unit whereby forces applied to said linkage member will cause relative movement of linkages connected to said stud members.

4. A tie rod joint having an open-ended casing provided with means for connection to a tie rod, a pair of oppositely disposed stud elements extending from the ends of said casing, seating and centering means cooperative with the internally disposed ends of said stud elements whereby said stud elements tilt and/or rotate about a common center, and resilient means urging said stud elements and said seating and centering means toward one end of said casing for bottoming a stud element in bearing relation with the casing.

5. A tie rod joint having an open-ended casing provided with means for connection to a tie rod, a pair of oppositely disposed studs extending from the ends of said casing, hollow segmental ball ends on said studs within said casing, a ball disposed between said ends, and means urging said ball and studs toward one end of said casing for bearing contact therewith about one segmental ball end.

6. A tie rod joint having an open-ended casing provided with means for connection to a tie rod, a pair of oppositely disposed stud elements extending from the ends of said casing, one of said stud elements having a ball end disposed within said casing, the other of said stud elements having a hollowed segmental ball end disposed within said casing and nesting said ball end of said first stud element, and means urging said ends of said stud elements toward one end of said casing in bearing relation therewith.

7. A tie rod joint comprising a housing provided with a central bore extending therethrough and means for connection to a tie rod, a segmental spherical bearing surface within said housing at one end of said bore, studs projecting freely from each end of said bore and having hollow segmental ball ends disposed within said bore, a ball member seated within said hollow segmental ends, and resilient means urging said studs and ball member toward said bearing surface for bottoming a ball end of one stud in bearing relation with said segmental spherical bearing surface of said housing.

8. A tie rod joint comprising a housing provided with a bore extending therethrough and means for connection to a tie rod, studs projecting freely from each end of said bore, one of said studs having an internally disposed hollow segmental ball end, the other of said studs having an internally disposed ball end seated in said hollow end of said other stud, a segmental spherical bearing surface within said housing at one end of said bore, and means urging said studs toward said bearing surface for bottoming the hollow segmental ball end of said one stud in bearing relation with said bearing surface.

9. A linkage joint comprising a housing provided with a central bore extending therethrough and means for connection to a linkage member, studs projecting freely from each end of said bore and having hollowed segmental ball ends disposed within said bore, a ball member seated within said ends, a bearing member embracing one of said segmental ball ends and bearing against said housing adjacent one end thereof, a washer member freely disposed within said bore and embracing the other segmental ball end, a retaining member secured within said bore adjacent the other end thereof, and a coiled spring acting between said retaining member and said washer member to urge said studs and said ball member toward said bearing member.

10. A linkage joint comprising a housing provided with a central bore extending therethrough and means for connection to a linkage member, studs projecting freely from each end of said bore, one of said studs having a hollow segmental ball end within said bore, the other of said studs having a ball end within said bore seating within said segmental ball end, a bearing element embracing one of said studs within said housing adjacent one end thereof, a washer member freely disposed in said bore embracing the other of said studs, a retaining member secured in said bore adjacent the other end thereof, a coil spring between said retaining member and said washer member urging said studs toward said bearing element, and a dust cover adjacent the bearing end of said housing.

11. A tie rod joint or the like comprising a housing having a central bore extending therethrough and a laterally extending shank for connection to a linkage member of a vehicle steering control unit, studs projecting freely from each end of said bore and having hollowed segmental ball ends disposed within said bore, a free rigid ball seated within said hollowed ball ends, resilient means embracing the shank of one of said studs urging said ball ends and said ball toward one end of said housing, and said housing having an internal bearing wall accommodating tilting movement and receiving one of the thus urged ball ends in bearing relation.

12. A tie rod joint comprising a housing having a central bore therethrough and a laterally extending shank for connection to a linkage member of a steering control unit, studs projecting freely from each end of said bore, one of said studs having a hollow segmental ball end disposed within said bore, the other of said studs having a ball end seated within said hollow segmental ball end, resilient means embracing the shank of one of said studs urging said studs toward bearing contact in said housing adjacent one end thereof, and linkage members secured to the projecting ends of said studs whereby forces applied to one of said linkage members causes corresponding relative motion of the other of said linkage members.

13. A tie rod joint or the like which comprises a hollow open-ended housing with a converging bearing wall at one open end defining a restricted aperture and a laterally extending mounting stem intermediate said open ends, a closure washer secured in the other open end of the housing defining a second restricted aperture for the housing, a pair of opposed headed studs having heads in said housing and shanks extending through the restricted apertures, opposed bearing rings on said stud heads, rigid means associated with the opposed stud heads and accommodating relative rotation and tilting of the studs, and resilient means between the closure washer and the adjacent bearing ring to urge the stud heads and bearing rings together.

14. In a tie rod joint or the like having a pair of opposed studs tiltable and rotatable in a housing, the improvements of rigid means in non-contacting relation with the housing nested between the studs and forming a common tilting center therefor, a bearing wall in one end of said housing, and resilient means urging the studs and rigid means toward said one end of the housing to bottom one of the studs on said bearing wall in tiltable and rotatable relation therewith.

MARSHALL H. ALLDREDGE.
MATTHEW P. GRAHAM.

REFERENCES CITED

The following references are of record in the file of this patent:

UNITED STATES PATENTS

| Number | Name | Date |
| --- | --- | --- |
| 2,049,502 | Hufferd et al. | Aug. 4, 1936 |
| 2,178,206 | Katcher | Oct. 31, 1939 |
| 2,470,205 | Alldredge | May 17, 1949 |

FOREIGN PATENTS

| Number | Country | Date |
| --- | --- | --- |
| 428,918 | Great Britain | May 21, 1935 |